United States Patent [19]

Western

[11] Patent Number: 4,558,230
[45] Date of Patent: Dec. 10, 1985

[54] HIGH INTEGRITY DUAL INPUT POWER SUPPLY

[75] Inventor: Ralph E. Western, Cedar Rapids, Iowa

[73] Assignee: Rockwell International Corporation, El Segundo, Calif.

[21] Appl. No.: 551,385

[22] Filed: Nov. 14, 1983

[51] Int. Cl.<sup>4</sup> ............................ H02J 9/00; H02J 1/10
[52] U.S. Cl. ........................................ 307/66; 307/24;
                307/48; 307/53; 363/26; 363/56
[58] Field of Search ..................................... 307/43–46,
    307/52, 53, 64, 66, 80, 48, 18, 23, 24, 55, 56, 57,
                                58; 363/26, 53, 56

[56] References Cited
U.S. PATENT DOCUMENTS 3,956,638  5/1976  Ahrens et al. .................... 307/48
4,177,389 12/1979  Schott ............................. 307/53 X
4,208,706  6/1980  Suzuki et al. .................... 363/26
4,325,113  4/1982  Tomlie, Jr. ..................... 363/26 X
4,425,613  1/1984  Shelly ............................. 363/26
4,456,949  6/1984  Incledon ......................... 363/26
4,462,069  7/1984  Becky ........................... 363/56 X Primary Examiner—A. D. Pellinen
Assistant Examiner—T. DeBoer
Attorney, Agent, or Firm—Richard W. Anderson; Robert C. Mayes; H. Fredrick Hamann

[57] ABSTRACT

A high integrity multiple output power conditioner operating from redundant dc sources utilizes circuits to combine the sources to share a load and provide source isolation in event of component failure in any one of plural converters employed. Multiple ground planes permit high integrity checking of individual operation of multiple power converters employed in the system.

4 Claims, 8 Drawing Figures

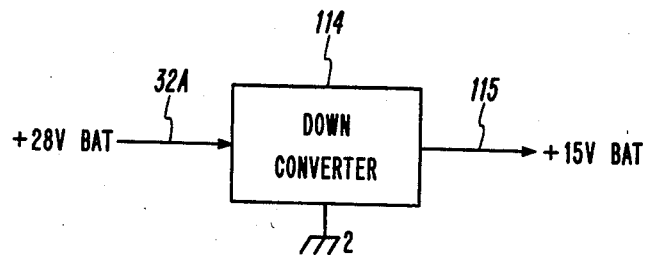
FIG. 5
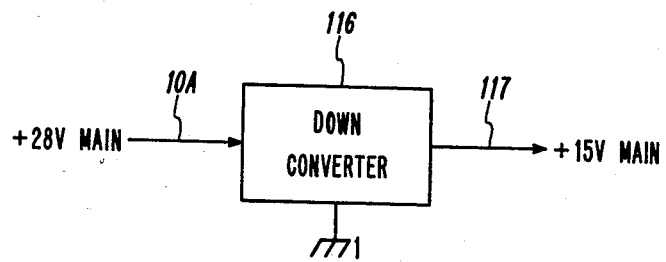
FIG. 6
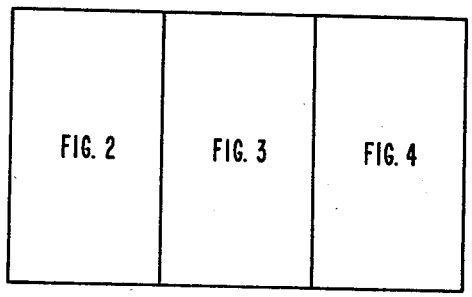
FIG. 7
⏚1  GROUND — 28V MAIN SUPPLY
⏚2  GROUND — 28V BATTERY SUPPLY
▽   GROUND — 72V RETURN
≡   GROUND — COMPUTER SIGNAL
FIG. 8

HIGH INTEGRITY DUAL INPUT POWER SUPPLY

The Government has rights in this invention pursuant to Contract No. NASI-15325 awarded by the National Aeronautics and Space Administration.

This invention relates generally to electrical power supplies and more particularly to a reliable power conditioner operating from multiple redundant power sources.

Power supplies usable with critical equipment such as aircraft control require an extremely reliable power conditioner, and means have long been exploited to provide such power supplies with a backup feature, such as by utilizing a main power source on an aircraft, for example, along with a battery backup source for the aircraft, such that upon failure of the main source of power, the power supply reverts or switches to the emergency backup source and critical user functions are not unduly interrupted.

With the advent of computer controlled aircraft flight control systems, the requirements on power supplies have become increasingly more stringent. In these applications power interruptions must be eliminated and the power supplied to the computer user equipment must be free from noise spikes and glitches which might otherwise cause serious functional breakdowns in the user equipment.

To this end, power supplies of a design which operate from redundant dc input sources are known which utilize a 28-volt main input source along with a 28-volt battery input source each of which independently develops the required power outputs for a user equipment, with these independently developed sources being "OR'ed" by means of steering diodes to common output lines which supply the user equipment. The philosophy of this design is that either of the redundant power supply sources is capable of providing power for the load and that with proper operation of each of the redundant sources the power developed by the redundant sources is shared by the load.

However, the employment of diode "OR'ing" of 28-volt main and battery redundant input sources may not provide low enough failure rates to satisfy certain stringent requirements.

The object of the present invention is the provision of a dual input power conditioner having greater integrity than known power supplies of this type. The present invention is featured in isolation between input sources so that a component failure in one of the dual input channels does not overload the other source.

The present invention further features the provision of a dual source power supply where either source is capable of powering the load upon failure of the other source and where the sources share the load if both sources are operative.

The present invention is further featured in a high integrity dual input power supply with means for checking capability of each source to supply the load.

A still further feature of the present invention is the provision of a dual input power supply incorporating current limiting and monitoring of an external load along with indication that that load is present.

These and other features and objects of the present invention will become apparent from reading the following description with reference to the accompanying drawings in which:

FIG. 1 is a functional block diagram of a high integrity dual input power supply in accordance with the present invention;

FIGS. 2, 3 and 4 jointly comprise a schematic diagram of the improved power supply in accordance with the present invention;

FIG. 5 is a functional diagram of a dc power conversion utilized in the system of FIGS. 2, 3 and 4;

FIG. 6 is a functional diagram of a further power conversion utilized in the system of FIGS. 2, 3 and 4;

FIG. 7 is a diagrammatic representation of the manner in which FIGS. 2, 3 and 4 collectively comprise the schematic of the present invention; and FIG. 8 illustrates four distinctly separate ground returns or ground planes utilized in the high integrity power supply of the present invention.

The power conditioner to be described operates from redundant dc sources. Circuits utilized to combine these sources provide independent check of single source operation and provide source isolation in the event of component failure in converters utilized in each of the redundant power supply development circuitries.

The power supply to be described was particularly designed to provide integrity demanded by a computer controlled active controls system for a transport aircraft. As such, the system, as depicted functionally in FIG. 1, supplies a high integrity 72-volt dc output utilized in powering computer equipment which in turn controls the operation of solenoids utilized in activating the aircraft control system. The power supply of FIG. 1 provides a second high integrity output source to power the computer controlled solenoids, while a third output from the power supply of FIG. 1 provides certain solenoid logic signals which may be utilized in monitoring operation of the solenoids employed in the user equipment.

Figure 1:
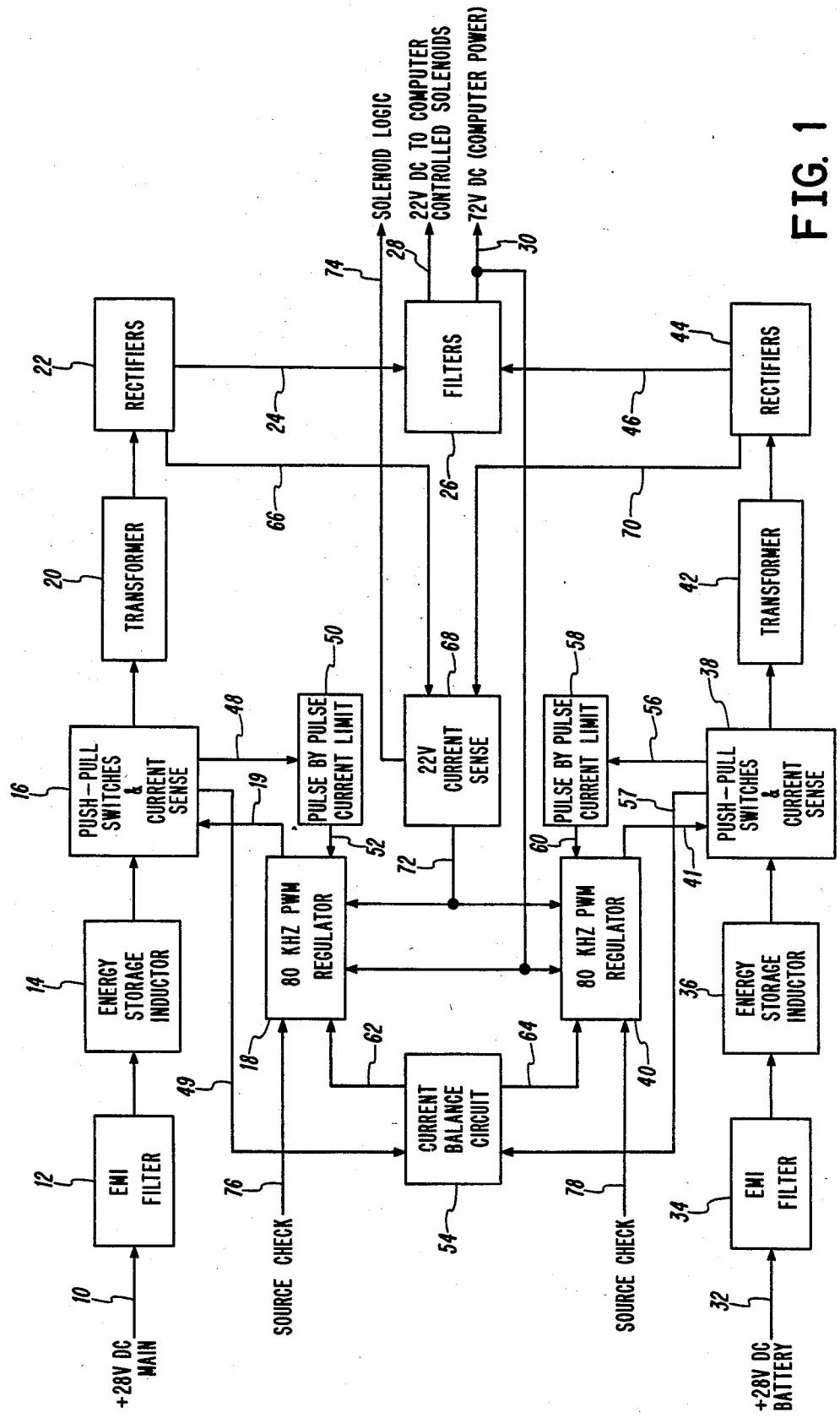

As will be further evident, the system, as depicted functionally in FIG. 1, provides a method of combining two dc power sources that provides isolation in the event of component failure such that in the event of such failure, the non-failed supply is not overloaded. Means will be described for testing the operation of the user equipment load from either of the redundant power supply sources. The system to be described utilizes input power ground returns which are separated, permitting high integrity power source operational checks which may be instigated at the user equipment location. The system to be described further provides input current limiting as well as user equipment solenoid current limiting and includes a provision for user equipment solenoid current flow indication.

With reference to FIG. 1, the system is provided with dual 28-volt dc inputs. A +28-volt dc main source 10 is applied to the upper power conversion channel of FIG. 1 while a +28-volt dc battery source 32 is applied to the lower channel of FIG. 1. The upper and lower channels of the system of FIG. 1 are identical and equally able to power the load. With reference to the upper channel of FIG. 1, 28-volt dc main input 10 is applied to an electromagnetic interference filter 12 the output of which is applied through an energy storage inductor 14 as input to a push-pull switching and current sensing circuitry 16. Push pull switches of block 16 are controlled by the pulse-width modulated output of 80-KHz pulse width modulator regulator 18 to switch 28-volt dc main input in a push-pull manner to output transformer 20. Transformer 20 provides source isolation for the upper channel and the transformer outputs are applied to rectifiers 22 output 24 of which are applied through filters 26 to provide 22-volt dc output 28 for powering computer controlled solenoids in the user equipment and to provide 72-volt dc output 30 utilized for computer user equipment by means of which the solenoids are controlled.

Now referring to the lower channel of FIG. 1, 28-volt dc battery source 32 is applied to EMI filter 34 the output of which is applied through energy storage inductor 36 and switched in a push-pull manner by switching and current sensing circuitry 38 to the input of output transformer 42. Here again, in a manner similar to the upper channel, push-pull switches in circuitry 38 are controlled by the pulse width modulated output of an 80-KHz pulse width modulated regulator 40. Outputs from transformer 42 are applied through rectifying circuitries 44 to provide inputs 46 to the filters 26. Outputs of the filters comprise 22-volt dc and 72-volt dc to the user equipment.

The converters in the upper channel of the system of FIG. 1 further incorporates a current sensing arrangement in block 16 to provide input current feedback 49 to a current balance circuit 54 which provides a current regulating feature for the 80-KHz pulse width modulator regulator 18. An additional output 48 is applied to a pulse-by-pulse current limiting circuitry 50 to provide an input 52 to the 80-KHz pulse width modulator regulator 18 to establish pulse-by-pulse input current limiting in the upper converter channel. Similar functions are depicted in the lower channel of FIG. 1 by means of pulse-by-pulse current limiting block 58 providing an input 60 to 80-KHz pulse width modulator regulator 40 and current sensing function in block 38 providing an input 57 to the current balance circuit 54.

Each of the upper and lower channels is depicted in FIG. 1 as providing an output 66 or 70 as input to 22-volt sensing circuitry 68. Sensing circuitry 68 provides an output 72 which is inputted to the 80-KHz pulse width modulator regulators 18 and 40 in each of the upper and lower channels. As will be further described, current sensing circuitry 68 senses current in each of two 22-volt dc outputs to the computer controlled solenoids in the user equipment and is utilized to effect a shutdown of both of the 80-KHz pulse width modulator regulators 18 and 40 if either of the 22-volt solenoid outputs becomes shorted.

The 80-kHz pulse width modulator regulators are provided with a source check input. A source check input 76 is applied to a 80-kHz pulse width modulator regulator 18 in the upper channel and a source check input 78 is applied to the 80-kHz pulse width modulator regulator in the lower channel. As will be further described, these inputs may be initiated under the control of an operator of the user equipment and provide a means by which either of the converters in the upper and lower channels of FIG. 1 may be independently disabled, with the nondisabled one then providing the full power output. This feature is usable as during preflight checks of, for example, an aircraft computerized flight control system, and provide assurance that each of the redundant power supplies of the system is, by itself, operable and capable of powering the equipment.

The power supply is thus seen to be basically comprised of two UP converters, each of which is independently regulated under control of its associated pulse width modulator regulator, and each of which is independently current limited. Output current sensing circuitry is incorporated to shut off both of the pulse width modulators in the event of a short in the 22-volt dc power to the load solenoids. Additionally, means are provided to independently remotely shut down either of the pair of UP converters from a remote controlled source to permit preflight checks assuring that each of the converters is operable and capable of powering the load.

Figure 2:
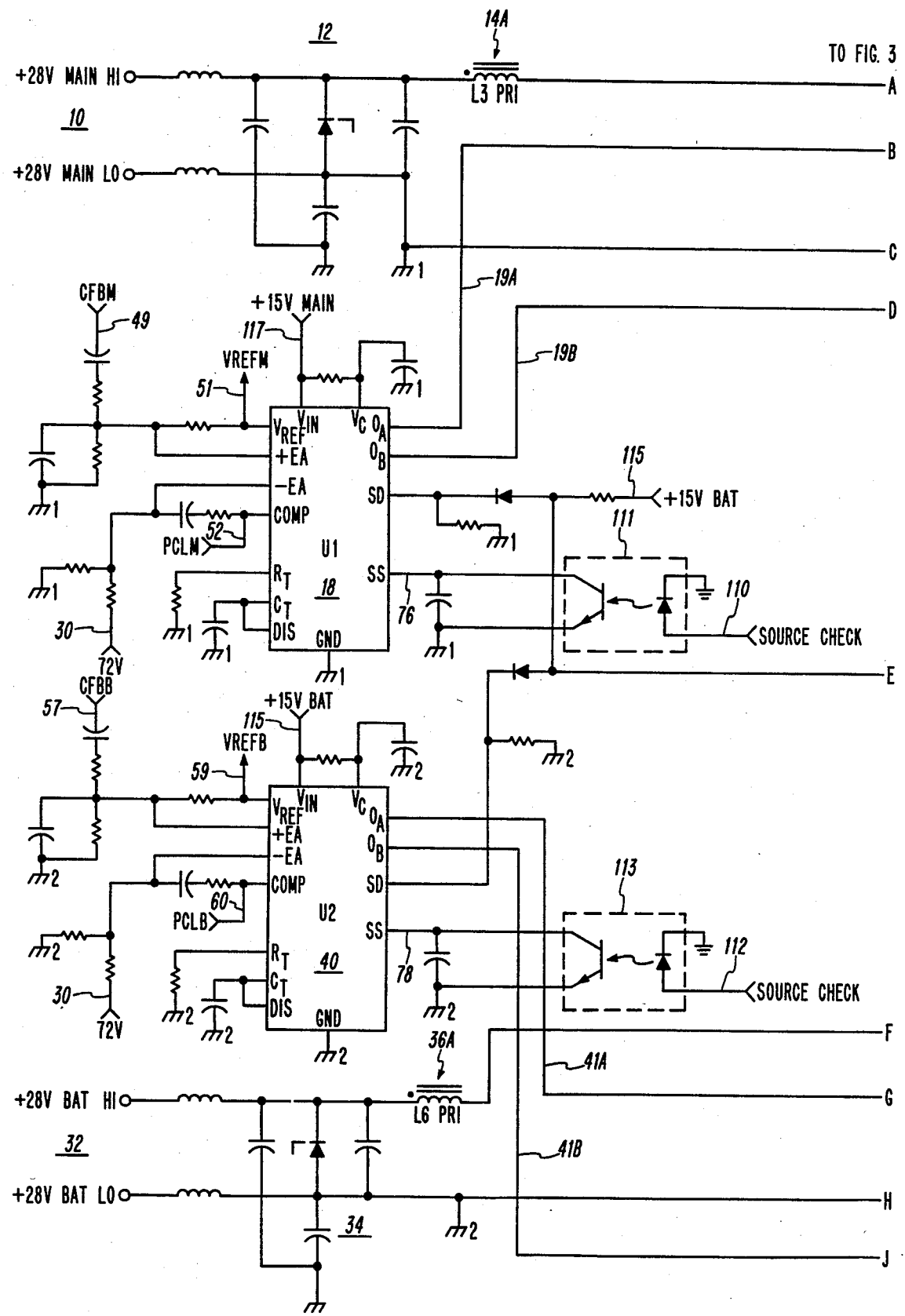
Figure 3:
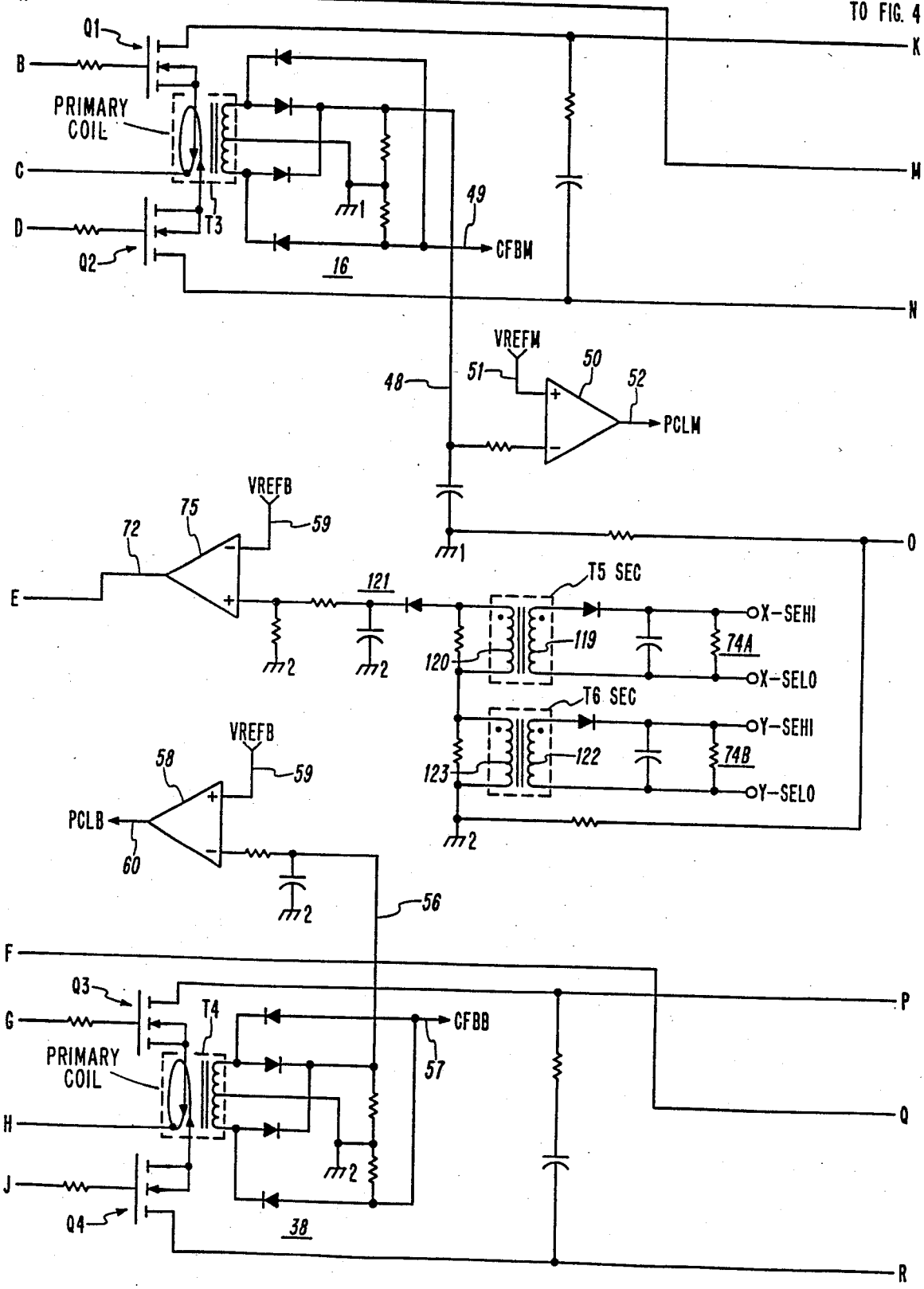
Figure 4:
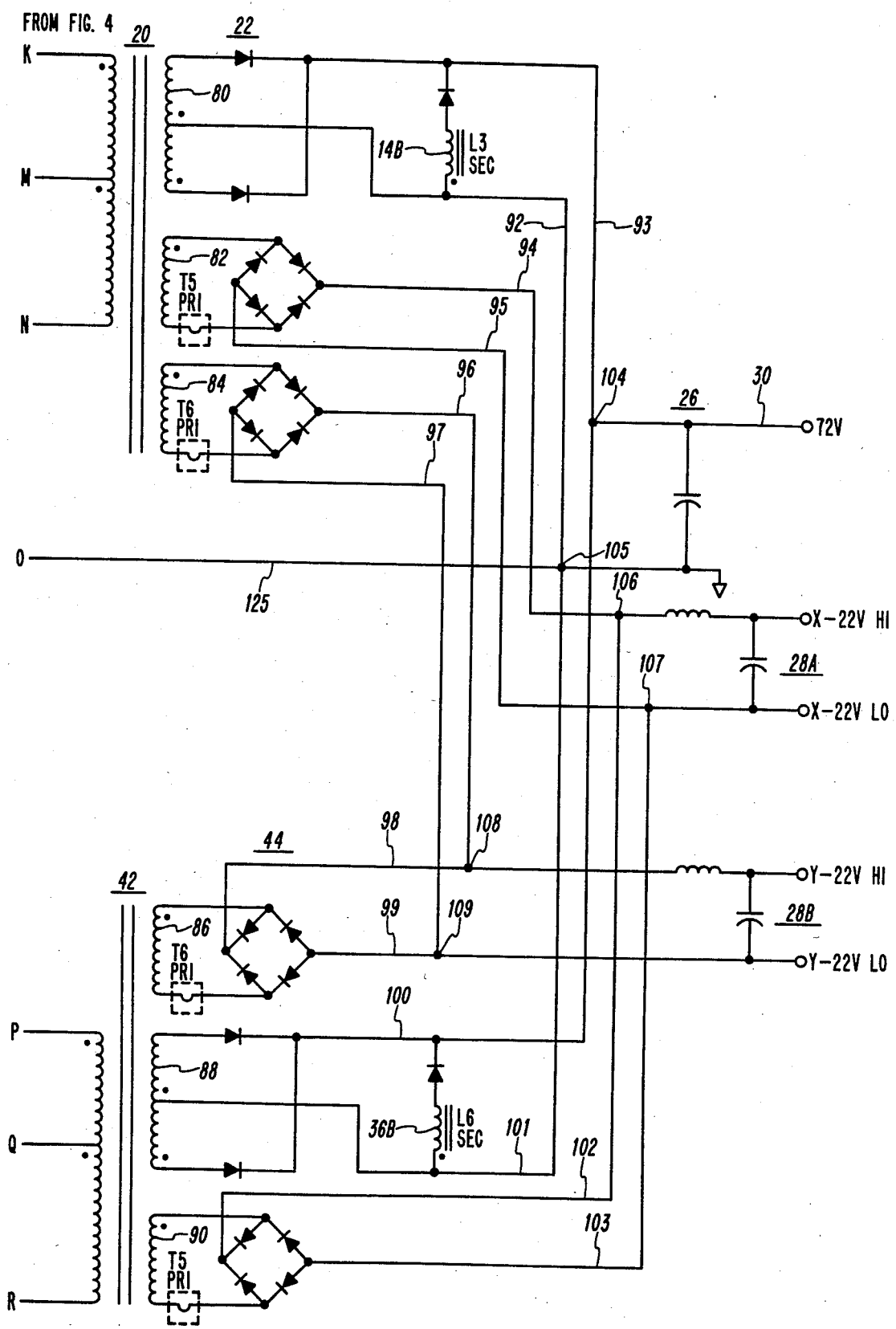

The system of FIG. 1 is schematically depicted in FIGS. 2, 3 and 4. Reference is made to FIG. 7 which illustrates that FIGS. 2, 3 and 4 collectively comprise the shematic diagram of the system.

The system is powered by 28-volt dc main input 10 to the converter in the upper portion of the schematic and independently by 28-volt dc battery source 32 in the lower portion of the schematic diagram. With reference to the upper channel of the schematic, the 28-volt dc main source 10 is applied to an EMI filter 12 which supplies 28-volt dc HI to the center tap of the primary of output transformer 20 as depicted in FIG. 4. The ground return for the 28-volt main source 10 is alternately switched through push-pull switches Q1 and Q2 to the respective ends of the primary winding of output transformer 20. Switches Q1 and Q2 comprise field effect transistors which are alternately switched at an 80-kHz rate by outputs 19A and 19B of 80-kHz pulse width modulator regulator 18. Pulse width modulator regulator 18 may comprise a commercially available Silicon General SG 1525A chip.

Three rectified and filtered outputs are developed from secondary windings on output transformer 20. Secondary winding 80, in conjunction with rectifiers 22 and filter elements including L3 (14B), develops 72-volt dc across outputs 92 and 93 which are tied to output junction points 105 and 104, respectively. A capacitor element 26 operates in conjunction with transformer L3 secondary winding 14B and transformer L3 primary winding 14A in the input end of the upper channel to provide filtering. Primary and secondary windings 14A and 14B comprise a ferrite inductor/transformer. The primary winding 14A limits current when switches Q1 and Q2 are turned on and secondary winding 14B dissipates energy in L3 and Q1 and Q2 are cut off. The upper channel provides a 72-volt dc output at 30 which is reference to a separate 72-volt dc ground. It is noted that the 72-volt dc output from the upper converter channel is isolated from the 28-volt dc main input 10 to the upper channel. In this regard, reference is made to FIG. 8 which depicts that the system of FIGS. 2, 3 and 4 incorporates four distinctly separate ground returns of ground planes. It is noted that the 28-volt main input 10 is referenced to a 22-volt main supply ground while the 72-volt output from the upper channel, because of the isolation of output transformer 20, is referenced to 72-volt ground.

Two further outputs are developed by the upper converter channel. Secondary winding 82 and associated rectifier, provides 22-volt dc on outputs 94 and 95 which are respectively tied to first 22-volt output junction points 106 and 107. This output is filtered and provided as a first 22-volt dc output at 28A. Secondary winding 84 of output transformer 20 develops a second rectified 22-volt dc output on lines 96 and 97 which are tied to junction points 108 and 109 to provide a filtered second 22-volt dc output at 28B. As referenced above, these two separate 22-volt dc outputs 28A and 28B are utilized to power computer controlled solenoids from the user equipment.

Now with reference to the push-pull switches and current sensing circuitry 16 of the upper channel, as shown in FIG. 3, a current transformer 73 is associated with the field effect transistors Q1 and Q2. Each of the source electrodes of field effect transistors Q1 and Q2 is connected through an associated primary winding loop of current transformer T3 and the 28-volt Main ground return. Secondary windings of current transformer T3 are applied to a diode and resistive network to develop a first control output 49 labeled CFBM (current feedback main) which comprises a signal indicative of the current flow through the switching network as a controlling input to the 80-kHz pulse width modulator regulator 18 that controls the switches Q1 and Q2. This input 49 to pulse width modulator regulator 18 effects a current limit in the upper channel converter. In effect, the input current of the 28-volt main input 10 is monitored by output 49 from the current sensing network and regulator converter 18 responds to the output 49 by causing the pulse width modulator to reduce the on-time of Q1 and Q2 to limit the peak current to a set value.

A second output 48, as obtained from current transformer T3, is applied as a first input to a comparator 50 which receives a reference voltage 51 as a second input thereto. The output 52 from comparator 50 is inputted to the pulse width modulator regulator 18 associated with the upper channel to effect pulse-by-pulse current limiting. Reference input 51 to comparator 50 is obtainable as an output from the pulse width modulator regulator chip 18.

Now with reference to FIG. 4, it is noted that each of the 22-volt secondary windings 82 and 84 of output transformer 20 is serially connected with the primary winding of further current transformers. Secondary winding 82 is serially connected with a primary winding of a current transformer T5, while secondary winding 84 of transformer 20 is serially connected with a primary winding of a current transformer T6. The secondary windings of current transformers T5 and T6 are depicted in the central portion of FIG. 3. Each of current transformers T5 and T6 is shown to have two secondary windings. The outputs from first secondary windings 120 and 123 of current transformers T5 and T6 are summed and applied through rectifier circuitry 121 as an input to a further comparator 75 which receives a reference input at 59 which is obtainable as an output from 80-kHz pulse width modulator regulator 40 in the battery powered channel. Output 72 from comparator 75 is applied as inputs to each of the pulse width modulator regulators 18 and 40 associated respectively with the upper and lower channels to effect a shutdown of both the upper and the lower channel converters should either of the 22-volt dc outputs become shorted. The independent current sensing of each of the 22 volt dc outputs from the system prevents fire and smoke in the event that the 22-volt dc outputs should become shorted. A short on either of the 22-volt outputs shuts down both converters until the load returns to normal.

Current sensing transformers T5 and T6 have respective isolated secondary windings 119 and 122, each connected with a half-wave rectifier and filter to develop signal voltages 74A and 74B to indicate presence of load on the associated 22-volt output. These outputs are conveniently of transistor-transistor logic (TTL) level to provide logic level outputs to the user equipment to indicate such loads being present.

Pulse width modulator regulator 18 in the main channel is provided with a further disabling input by means of which the main converter channel may be disabled selectively in response, for example, to a preflight check initiated at the user equipment.

With reference to FIG. 2, a source check input 110 may be applied to optical coupler 111 to provide an output 76 for application to the pulse width modulator regulator chip 18. Output 76 is used to shut down pulse width modulator regulator 18 and thus disable the 28-volt main converter such that, as will be further apparent, the user equipment is powered entirely by the lower channel converter. This check may be expeditiously made to assure that the lower converter channel is operable and capable of powering the load.

A second battery-powered converter of the power supply is depicted in the lower portion of the schematic of FIGS. 2, 3 and 4 and is identical in form and function to that of the above-described main-powered upper channel converter. 28-volt battery source input 32 is applied through electromagnetic interference filter 34 and energy storage inductor 36A to the center tap of output transformer 42 in the lower channel (see FIG. 3). Ground return for the 28-volt battery source 32 is effected by the alternate switching of field effect transistors Q3 and Q4 in push-pull switching and sensing circuitry 38. Q3, when switched, provides a ground return for the upper end of the primary winding of output transformer 42, while Q4 provides the ground return for the lower end of the primary winding of output transformer 42. As in the upper channel, the output transformer 42 of the 28-volt battery powered converter is provided with three secondary windings, with secondary winding 88 developing a 72-volt dc output and secondary windings 86 and 90 providing respective 22-volt dc outputs. Rectified output from secondary winding 88 is developed on output lines 100 and 101, respectively. Output line 101 is tied to output junction point 105 while output line 100 is tied to output junction point 104. It is thus seen that the 72-volt output from the 28-volt main converter and the 72-volt output from the 28-volt battery converter are connected in common. Similarly, output from secondary winding 86 of output transformer 42 in the lower channel as developed on lines 98 and 99 is tied to the two junctions points 108 and 109 in common with the corresponding output from the upper channel, while the 22-volt output developed by secondary winding 90 of output transformer 42 in the lower channel, as developed on lines 102 and 103, is tied in common with the corresponding output from the upper channel. In operation, the three dc outputs from the power supply are powered in common from the two independent main and battery powered converters, with isolation being provided by the respective output transformers 20 and 42. When both the input converters are operating, the load is shared by the main and battery channels. Upon failure of one or the other of the main and battery channels, the output is provided by the non-failed one of the redundant power sources.

Current limiting and shutdown features in the battery power lower channel of FIGS. 2, 3 and 4 are identical with those described with respect to the upper channel. Current feedback 57 in the lower channel is developed by rectifying the output of current transformer T4 associated with field effect switching transistors Q3 and Q4, and applied as an input to pulse width modulator regulator 40. Pulse by pulse current limiting (PCLB) is developed in the same manner as in the upper channel by applying rectified output 56 from the secondary circuit of current transformer T4 as an input to comparator 58 where it is compared with reference voltage 59 obtained from the pulse width modulator 40 associated with the lower channel. Comparator output 60 is applied back to the pulse width modulator 40 to effect current limiting on a pulse-by-pulse basis by reducing the on-time of field effect transistors Q3 and Q4 to limit the peak current to a set value. Shutdown of the 28-volt dc battery powered channel in the lower portion of FIGS. 2, 3 and 4 is effected in common with that of the upper channel by application thereto of the previously described output 72 from the comparator 75 with the output developed by the secondary windings 120 and 123 of current transformers T5 and T6 which each have respective second primary windings in series with the with the 22-volt output secondary windings 86 and 90 of output transformer 42 in the lower channel.

The 28-volt battery converter may be selectively disabled upon an initiation of a source check input 112 (FIG. 2) from the user equipment which activates optical coupler 113 to provide a disabling input 78 to pulse width modulator 40 to thus shut down the battery powered converter in order to ascertain that the upper main powered converter is operable and capable of powering the load.

The power supply of the present invention is thus seen to provide independent main and battery powered converters which are tied to common output terminals. Isolation is provided by respective output transformers so that component failure in one of the input converters does not overload the other source. The system provides that either source can power the computer load upon failure of the other converter, and that the main and battery powered converters share the load if both the main and battery channels are operable. The source check feature provides a means for checking capability of each source to supply the load in the absence of the other. Current limiting and monitoring of the external 22-volt load is provided to indicate when that load is present. The +15-volt battery and +15-volt main sources utilized as supply for the respective pulse width modulators 18 and 40, may, as functionally in FIGS. 5 and 6, be obtained from respective down converters.

FIG. 5 illustrates the +28-volt battery source 32A being applied to a down converter 140 to supply +15-volt battery voltage 115, where the converter 114 utilizes the ground plane associated with the 28-volt battery source.

FIG. 6 illustrates +28 volt main input 10A applied to a down converter 116 referenced to the ground plane associated with the 28-volt main source to supply +15-volt main output 117. The separation of input power returns permits checking integrity during the aforedescribed power source checks.

The present invention thus provides isolation between redundant input sources so that a component failure in one input converter does not overload the other source; provides that either source can power the load and share the load if both sources are present; provides a means for checking capability of each source to independently supply the load; and provides current limiting and monitoring of external 22-volt load to indicate when that load is present.

Although the present invention has been described with respect to a particular embodiment thereof, it is not to be so limited as changes might be made therein which fall within the scope of the invention as defined by the appended claims.

I claim:

1. A multiple output power conditioner system operating from redundant and separate first and second dc sources comprising a first power converter powered by said first dc source and a second power converter powered by said second dc source;

each of said power converters comprising switching means and a power transformer, with said switching means operable to switch the associated power source to the primary winding of said power transformer in a push-pull fashion;

at least one secondary winding associated with each of said power transformers;

rectifying means connected to said secondary winding to develop a predetermined dc output voltage, each said dc output voltage from said first converter being connected in parallel with the corresponding dc output from the second one of said powr converters wherein said first and said second power converters are each capable of supplying. requisite load power jointly, and alternatively, individually, wherein each of said first and second power converters and said dc output voltages are referenced to individually different ones of plural ground return planes;

including first and second pulse width modulator regulator means associated respectively, with each of said first and second power converter means;

each of said pulse width modulator regulator means effecting a predetermined periodic and alternative closing of first and second switches associated with each of said converter means to provide alternate ground returns for said dc sources through an associated individual one of said plural ground return planes;

wherein each of said converter means is operably connected with a current transformer having primary winding means through which input current flow through each of said first and second switches, said secondary winding means connected with a comparator means for developing a control signal for application to the associated pulse width modulator regulator in the associated converter to effect pulse width modulation of that pulse width modulator to regulate and current limit the power switched to the power transformer primary winding of that converter; and further comprising current transformer means associated with at least one of the secondary windings associated with the power transformers in each of said first and second converters for sensing the output current flow in that secondary winding, each of said current transformers having a secondary winding;

means for providing a resistance load to each of the secondary windings of said current transformers, means responsive to the summation of the outputs of each of said resistive loads being in excess of a predetermined reference level to develop a shutdown control signal, and said shutdown control signal being applied to each of said pulse width modulator regulators associated with the said first and second converters to effect turn-off thereof in response to said shutdown control signal.

2. The power conditioner as defined in claim 1 wherein each of the switching means associated respectively with said first and second converters comprises first and second field effect transistors;

means for applying switching control signals from the associated pulse width modulator means to the respective gate electrodes of said field effect transistors, each of the source electrodes of said field effect transistors in each converter being coupled to an associated primary winding of said current transformer to the ground plane associated with that converter, the drain electrodes of said first and second field effect transistors being connected to respective opposite ends of the primary winding of the power transformer associated with that converter, the high input terminal of the associated dc input source being connected to the center tap of said associated power transformer and the low input terminal of the associated dc input source being connected to the ground plane associated with that converter.

3. The power conditioner as defined in claim 2 wherein each of the said power transformers comprises:

first and second secondary windings from which are developed first and second dc output voltages in each of said first and second converters, each of said first and second secondary windings being serially connected with the primary winding of respective first and second ones of said further current transformers, said first and second current transformers including a further secondary winding, the outputs of said further secondary windings being respectively indicative of power being drawn from said first and second power transformer secondary windings, respectively.

4. The power conditioner as defined in claim 3 further comprising:

selective turn-off means for each of said first and second converters, said selective turn-off means comprising first and second optical coupling means associated respectively with each of said converters, each of said optical coupling means being selectively energizable to provide an output means for application to the associated one of said pulse width modulators to effect selective turn-off of that modulator and thus the power converter with which that pulse width modulator is associated.

* * * * *